United States Patent [19]
Workman et al.

[11] Patent Number: 5,976,488
[45] Date of Patent: *Nov. 2, 1999

[54] PROCESS OF MAKING A COMPOUND HAVING A SPINEL STRUCTURE

[75] Inventors: Jason Workman, Secaucus, N.J.; Peter DellaValle, Hampden, Mass.

[73] Assignee: Phoenix Environmental, Ltd., Palm Desert, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/696,756

[22] Filed: Aug. 14, 1996

Related U.S. Application Data

[60] Division of application No. 08/155,616, Nov. 19, 1993, abandoned, and a continuation-in-part of application No. 08/349,644, Dec. 5, 1994, abandoned, which is a division of application No. 08/148,034, Nov. 3, 1993, Pat. No. 5,370,066, which is a continuation of application No. 08/054,758, Apr. 29, 1993, abandoned, which is a division of application No. 07/908,670, Jul. 2, 1992, Pat. No. 5,230,292, said application No. 08/155,616, is a continuation-in-part of application No. 08/148,034.

[51] Int. Cl.⁶ .......................... C01G 49/00; C01G 51/00; C01G 3/00; C01G 45/00
[52] U.S. Cl. .......................... 423/593; 423/594; 423/595; 423/598; 423/599; 423/600; 423/632; 423/326
[58] Field of Search .................................. 423/594, 593, 423/595, 598, 599, 600, 632, 326

[56] References Cited

U.S. PATENT DOCUMENTS

| | | |
|---|---|---|
| 1,130,212 | 3/1915 | Steere . |
| 2,800,091 | 7/1957 | Lotz et al. . |
| 2,917,011 | 12/1959 | Korner . |
| 2,979,000 | 4/1961 | Sifrin et al. . |
| 2,983,847 | 5/1961 | Spengler . |
| 3,417,717 | 12/1968 | Jacobovici . |
| 3,440,800 | 4/1969 | Messen-Jaschin . |
| 3,481,290 | 12/1969 | Wunderley . |
| 3,630,675 | 12/1971 | Prasky et al. ........................ 423/633 |
| 3,656,441 | 4/1972 | Grey et al. . |
| 3,722,733 | 3/1973 | Neumann . |
| 3,729,298 | 4/1973 | Anderson . |
| 3,771,468 | 11/1973 | Kelly . |
| 3,780,675 | 12/1973 | Frye et al. . |
| 3,832,519 | 8/1974 | Wolf et al. . |
| 3,834,326 | 9/1974 | Sowards . |
| 3,910,207 | 10/1975 | Altmann . |
| 3,913,499 | 10/1975 | Watts . |
| 3,918,374 | 11/1975 | Yamamoto et al. . |
| 3,996,862 | 12/1976 | Besik et al. . |
| 4,012,301 | 3/1977 | Rich et al. . |
| 4,038,108 | 7/1977 | Engel et al. . |
| 4,167,463 | 9/1979 | Conrad . |
| 4,181,504 | 1/1980 | Camacho . |
| 4,213,404 | 7/1980 | Spaulding . |
| 4,253,409 | 3/1981 | Wormser . |
| 4,266,948 | 5/1981 | Teague et al. . |
| 4,279,208 | 7/1981 | Guillaume et al. . |
| 4,291,634 | 9/1981 | Bergsten et al. . |
| 4,308,807 | 1/1982 | Stokes . |
| 4,320,709 | 3/1982 | Hladun . |
| 4,329,248 | 5/1982 | Ringwood . |
| 4,346,661 | 8/1982 | Nakamura . |
| 4,367,130 | 1/1983 | Lemelson . |
| 4,384,968 | 5/1983 | Polizzotti et al. . |
| 4,397,823 | 8/1983 | Dimpfl . |
| 4,398,471 | 8/1983 | Thomanetz . |
| 4,408,985 | 10/1983 | Anderson et al. . |
| 4,411,695 | 10/1983 | Twyman . |
| 4,417,529 | 11/1983 | Fujimoto et al. . |
| 4,432,344 | 2/1984 | Bennington et al. . |
| 4,438,705 | 3/1984 | Basic, Sr. . |
| 4,438,706 | 3/1984 | Boday et al. . |
| 4,447,262 | 5/1984 | Gay et al. . |
| 4,479,443 | 10/1984 | Faldt et al. . |
| 4,509,434 | 4/1985 | Boday et al. . |
| 4,526,712 | 7/1985 | Hirano et al. . |
| 4,539,916 | 9/1985 | Paoluccio . |
| 4,552,667 | 11/1985 | Shultz . |
| 4,574,714 | 3/1986 | Bach et al. . |
| 4,579,067 | 4/1986 | Peters . |
| 4,582,004 | 4/1986 | Fey et al. . |
| 4,599,955 | 7/1986 | Hepworth et al. . |
| 4,602,574 | 7/1986 | Bach et al. . |

(List continued on next page.)

FOREIGN PATENT DOCUMENTS

| | | |
|---|---|---|
| 0 207 924 | 1/1987 | European Pat. Off. . |
| 0 300 396 | 1/1989 | European Pat. Off. . |
| 37 35 061 | 4/1989 | Germany . |
| 41 20 061 A1 | 12/1992 | Germany . |
| 656 636 | 7/1986 | Switzerland . |
| 2 269 164 | 2/1994 | United Kingdom . |
| WO 86/02847 | 5/1986 | WIPO . |
| WO 93 02750 | 2/1993 | WIPO . |

OTHER PUBLICATIONS

Keenan et al., *General College Chemistry*, 5th Ed., pp. 488–490.

*Primary Examiner*—Steven Bos
*Attorney, Agent, or Firm*—Panitch Schwarze Jacobs & Nadel, P.C.

[57] ABSTRACT

Apparatus and a process are provided for converting and/or removing harmful constituents from solid hazardous or other undesirable waste material by heating the waste in a reactor in the presence of a continuous flow of oxygen and waste metals, wherein the waste material becomes a molten metal oxide bath which when solidified, has a spinel structure to chemically bond harmful constituents within the spinel structure by crystal chemical substitution. The resulting metal oxides are environmentally acceptable. A substantially gaseous effluent which may contain particulate material is also generated. The effluent is conducted through a high temperature zone to destroy organic and other harmful constituents influenced by temperature and dwell time. The effluent is further processed through an emissions treatment system to achieve acceptable environmental quality.

17 Claims, 4 Drawing Sheets

U.S. PATENT DOCUMENTS

| | | |
|---|---|---|
| 4,606,760 | 8/1986 | Fritz et al. . |
| 4,615,283 | 10/1986 | Ciliberti et al. . |
| 4,615,285 | 10/1986 | Bentell et al. . |
| 4,631,384 | 12/1986 | Cornu . |
| 4,644,877 | 2/1987 | Barton et al. . |
| 4,651,656 | 3/1987 | Wallner et al. . |
| 4,685,220 | 8/1987 | Meenan et al. . |
| 4,685,404 | 8/1987 | Sheppard et al. . |
| 4,688,495 | 8/1987 | Galloway . |
| 4,695,447 | 9/1987 | Shultz . |
| 4,695,448 | 9/1987 | Anthony . |
| 4,702,808 | 10/1987 | Lemelson . |
| 4,718,362 | 1/1988 | Santen et al. . |
| 4,724,776 | 2/1988 | Foresto . |
| 4,732,091 | 3/1988 | Gould . |
| 4,759,300 | 7/1988 | Hansen et al. . |
| 4,771,361 | 9/1988 | Varga . |
| 4,777,031 | 10/1988 | Senecal et al. ............... 423/594 |
| 4,781,171 | 11/1988 | Hemsath . |
| 4,793,270 | 12/1988 | Karasek et al. . |
| 4,821,653 | 4/1989 | Jones . |
| 4,848,995 | 7/1989 | Samish . |
| 4,873,930 | 10/1989 | Egense et al. . |
| 4,886,000 | 12/1989 | Holter et al. . |
| 4,909,160 | 3/1990 | Erick et al. . |
| 4,958,578 | 9/1990 | Houser . |
| 4,960,380 | 10/1990 | Cheetham . |
| 4,969,406 | 11/1990 | Buzetzki . |
| 4,977,839 | 12/1990 | Fochtman et al. . |
| 5,065,680 | 11/1991 | Cheetham . |
| 5,127,347 | 7/1992 | Cheetham . |
| 5,177,304 | 1/1993 | Nagel . |
| 5,191,154 | 3/1993 | Nagel . |
| 5,199,363 | 4/1993 | Cheetham . |
| 5,202,100 | 4/1993 | Nagel et al. . |
| 5,298,233 | 3/1994 | Nagel . |
| 5,301,620 | 4/1994 | Nagel et al. . |
| 5,320,051 | 6/1994 | Nehls, Jr. . |
| 5,322,547 | 6/1994 | Nagel et al. . |
| 5,324,341 | 6/1994 | Nagel et al. . |
| 5,354,940 | 10/1994 | Nagel . |
| 5,358,549 | 10/1994 | Nagel et al. . |
| 5,358,697 | 10/1994 | Nagel . |
| 5,374,299 | 12/1994 | Bodenstein et al. . |
| 5,374,403 | 12/1994 | Chang . |
| 5,395,405 | 3/1995 | Nagel et al. . |
| 5,538,532 | 7/1996 | Keegel, Jr. ........................ 423/108 |
| 5,571,486 | 11/1996 | Robert et al. ..................... 422/184.1 |
| 5,679,132 | 10/1997 | Rauenzahn et al. ............. 423/DIG. 12 |

PROCESS OF MAKING A COMPOUND HAVING A SPINEL STRUCTURE

CROSS-REFERENCE TO RELATED APPLICATIONS

This is a division of application Ser. No. 08/155,616, filed Nov. 19, 1993, now abandoned, which is a continion-in-part of application Ser. No. 08/148,034, filed Nov. 3, 1993, now U.S. Pat. No. 5,370,066, which is a continuation of application Ser. No. 08/054,758, filed Apr. 29, 1993, now abandoned, which is a division of application Ser. No. 07/908,670, filed Jul. 2, 1992, now U.S. Pat. No. 5,230,292. This is also a continuation-in-part of patent application Ser. No. 08/349,644, filed Dec. 5, 1994, now abandoned, which is a division of application Ser. No. 08/148,034, filed Nov. 3, 1993, now U.S. Pat. No. 5,370,066, which is a continuation of application Ser. No. 08/054,758, filed Apr. 29, 1993, now abandoned, which is a division of application Ser. No. 07/908,670, filed Jul. 2, 1992, now U.S. Pat. No. 5,230,292.

FIELD OF THE INVENTION

This invention relates to a method and apparatus for making solid hazardous waste material environmentally safe using heat and for making a compound having a spinel structure. More particularly, this invention relates to a process and apparatus for making an environmentally acceptable metal oxide having a spinel structure using high temperature through an exothermic reaction of iron-containing metals and oxygen in a substantially saturated or pure atmosphere of oxygen, creating a molten metal oxide bath. The effluent resulting from such treatment is also treated to form an environmentally acceptable effluent safe to release into the atmosphere.

BACKGROUND OF THE INVENTION

The disposal of solid waste material, particularly hazardous waste material, is a continuing problem. Hazardous waste materials must be properly handled to avoid harm to humans and the environment.

Incineration of waste material is a principal method of waste disposal. However, the ash by-products of incineration (including municipal incinerator ash, fly ash and bottom ash, for example) can themselves be considered a hazardous waste since it may contain labile heavy metals and other hazardous substances such as organic compounds, for example dioxins. Such substances are dangerous to humans and will cause contamination unless the ash is disposed of in a safe manner, such as in a regulated landfill. Disposal represents an ever-present risk to the environment. It is therefore desirable to provide a process and apparatus for further transforming hazardous wastes and other undesirable waste materials to materials which are suitable for environmentally safe disposal or even useful products. These other hazardous or otherwise undesirable wastes can also include chipped metal wastes, such as paint cans, waste metals or iron with waste oil, electroplated materials and contaminated aluminum stampings. Also included are low level radioactivity wastes, radioactive mixed wastes, and polychlorinated biphenyls (PCBs), among many others. It is also desirable to provide a process and apparatus for the transformation of solid waste materials considered to be extremely hazardous such as "sharps" (used surgical equipment such as scalpels) and other solid metallic medical wastes.

Processes and apparatus for reducing waste materials to separable constituents have been proposed in the past, but none is known to be widely used commercially. Deficiencies in high temperature waste treatment processes have limited their utility. Difficulties in processing the effluent of the combustion process which are themselves hazardous have required costly special treatment.

The apparatus and process of the present invention overcome the prior art problems and result in an efficient and effective treatment to convert undesirable waste material into environmentally acceptable and useful products with removal or destruction of unrecyclable components.

SUMMARY OF THE INVENTION

One aspect of the present invention is an apparatus for removing harmful or undesirable constituents from solid waste material, comprising a refractory-lined reactor capable of withstanding temperatures in excess of 1500° F., the reactor comprising at least a first and second interchangeable melt zone, one of the interchangeable melt zones being attached to and in communication with an effluent zone; means for introducing solid waste to be treated into the reactor, the solid waste containing at least one harmful or undesirable constituent; means for introducing oxygen into the reactor for maintaining an atmosphere substantially of oxygen within the reactor; means for converting the solid waste into an environmentally acceptable product in the melt zone using heat; means for conducting from the melt zone to the effluent zone any effluent resulting from converting the solid waste into an environmentally acceptable product; means for treating the effluent to remove harmful constituents therefrom and to produce an environmentally acceptable effluent; means for removing the environmentally acceptable effluent from the effluent zone; and means for removing the environmentally acceptable product from the melt zone.

Another aspect of the present invention is a process of converting hazardous or undesirable solid waste into an environmentally acceptable product comprising (a) introducing solid waste comprising iron and at least one harmful or undesirable constituent into a reactor capable of withstanding a temperature of at least about 1500° F.; (b) introducing oxygen into the reactor in a manner to create a substantially pure oxygen atmosphere in the reactor; (c) generating sufficient heat within the reactor to convert at least a portion of the harmful or undesirable constituents in the solid waste into an environmentally acceptable product comprising the harmful or undesirable constituent chemically bound in a spinel structure; and (d) removing the environmentally acceptable product from the reactor.

In yet another aspect, the invention provides a process of forming a compound having a spinel structure.

BRIEF DESCRIPTION OF THE DRAWINGS

The foregoing summary, as well as the detailed description of the preferred embodiments, will be better understood when read in conjunction with the appended drawings. For the purpose of illustrating the invention, there is shown in the drawings embodiments which are presently preferred; it being understood, however, that this invention is not limited to the precise arrangements and instrumentalities shown. In the drawings.

DETAILED DESCRIPTION OF THE PREFERRED EMBODIMENTS

Figure 1:
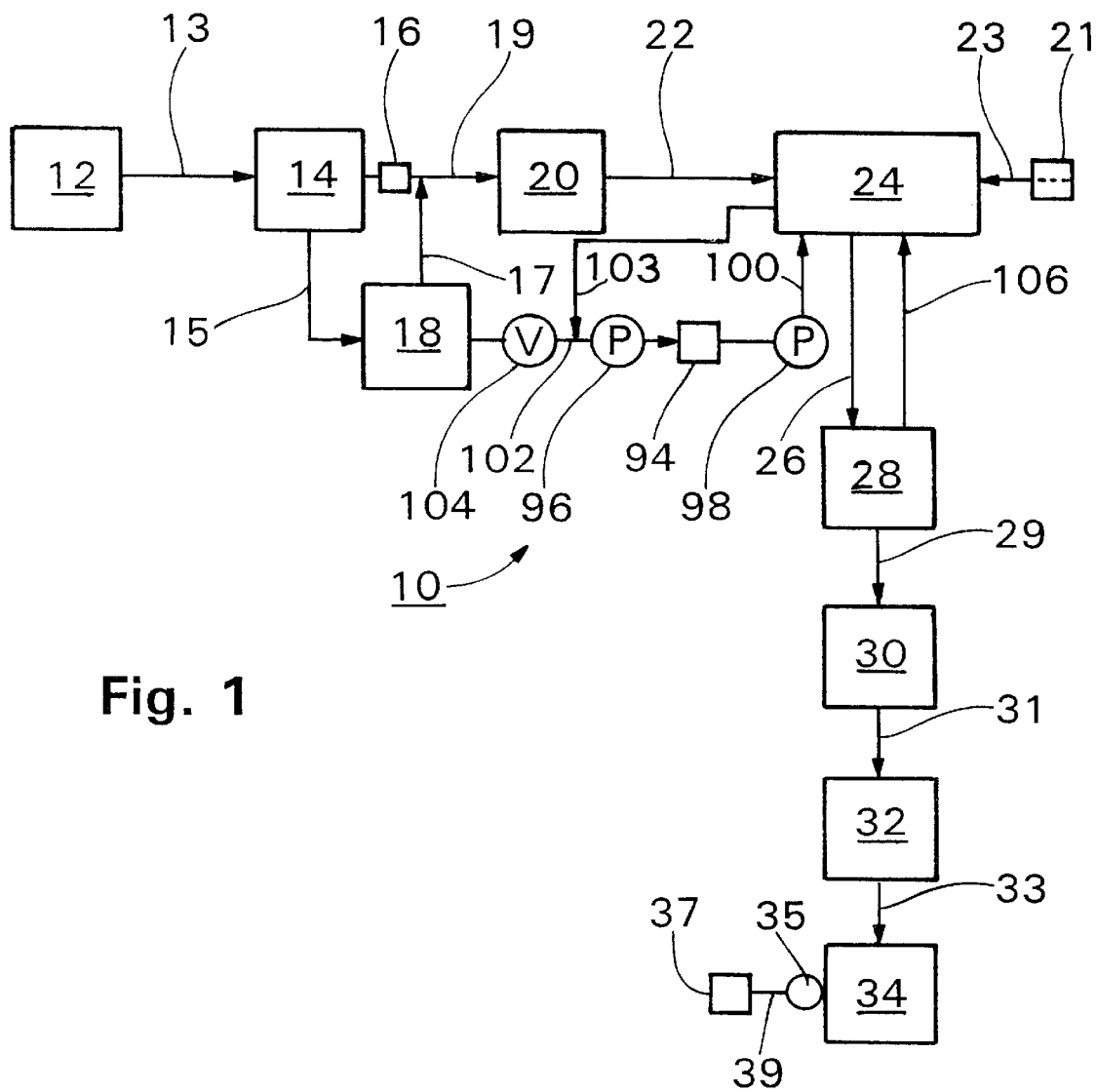
FIG. 1 is a schematic diagram of the system used to perform the process of the present invention including the effluent treatment system.

As noted above, one aspect of the present invention relates to an apparatus for converting and removing harmful constituents from solid waste material. The apparatus includes a reaction chamber having at least two zones—a melt zone and an effluent, and preferably three zones including a primary melt zone, a secondary melt zone and an effluent zone. Means for preferably continuously delivering the waste material into the first zone of the reaction chamber are provided. Additionally provided are means for introducing oxygen into the first zone of the reaction chamber. Oxygen input is at a flow rate and pressure sufficient to convert the continuous input of the waste stream to an oxide in conjunction with an iron-containing metal waste stream as necessary.

In the first zone of the reaction chamber the mix in the chamber reacts exothermically in the presence of a continuous flow of oxygen, converting the solid waste containing iron to a molten metal oxide bath. The temperature within all zones of the reaction chamber above the bath of molten metal oxide is high enough to destroy substantially all of the harmful constituents of the effluent, so long as such components are influenced by the high temperature for the dwell time they are at the elevated temperature. The apparatus also includes means for further mixing the agitated molten metal oxide bath in the first zone of the reaction chamber and means for conducting the molten metal oxide bath from the first zone of the reaction chamber into a third zone for final thorough mixing of the molten metal oxide bath. Moreover, there are means for conducting the effluent generated by the formation of the molten metal oxide bath from the first zone of the reaction chamber into a second zone of the reaction chamber, the second zone of the reaction chamber being adapted for reburning the effluent therein to destroy substantially all organic material influenced by temperature at an appropriate dwell time.

Means are also provided for treating the effluent to remove substantially all of the remaining particulate and harmful constituents to achieve acceptable environmental quality and means for releasing the treated effluent into the atmosphere.

The reactor design allows for the removal and interchangeability of the first zone and the third zone with other similar components for the flexibility of processing different waste streams and ease of repair and maintenance. The first and/or third zone can be adapted permanently for various methods of heating (hydrocarbon fuel burners, electric heaters, electric arcs, plasma arcs, lasers and the like) to satisfy other waste streams.

As noted above, another aspect of the present invention relates to a process for converting and/or removing harmful constituents from solid waste material.

A mix of the solid waste material and iron, as a fuel source, which may be part of the waste material or a separate component, is delivered continuously into a reaction chamber having three zones. The mix is heated in a first zone of the reaction chamber in the presence of a continuous flow of oxygen therethrough sufficient to displace substantially all other gases. Any method of providing a continuous flow of oxygen to and/or into the bath and waste metals can be utilized. The solid waste material in the presence of the iron and oxygen becomes an agitated bath of molten oxide and any other oxide constituents maintained by a self-sustaining exothermic reaction. The molten oxide is conducted from the first zone to a third zone of the reaction chamber where the molten oxide and/or any other constituents are thoroughly mixed prior to exiting.

The molten metal oxide is removed from the reaction chamber and cooled to a mixture of solid metal oxides. The solid metal oxide contains at least a portion of the hazardous or otherwise undesirable elemental constituents in a chemically bound spinel structure. At least a portion of the solidified metal oxide spinel is a magnetite ($Fe_3O_4$) structure, wherein some of the undesirable elements substitute for the iron in the spinel structure. This substitution is referred to as "crystal chemical substitution." This chemically bonds such undesirable elements into the spinel so that they do not leach into the environment. For example, nickel iron spinel has a solubility many orders of magnitude lower than that of borosilicate glass which has been proposed as a host to bind nuclear waste to prevent such waste from leaching into the environment. Thus, the spinels are very considerably less likely to result in leaching of the bound material into the environment.

Volatile constituents within the waste, as well as entrained particulate matter are generated as an effluent. The effluent is conducted into a second zone of the reaction chamber where the temperature of the second zone is high enough to destroy substantially all organic material in the effluent which is influenced by temperature at an appropriate dwell time within the second zone. The effluent is conducted from the second zone of the reaction chamber and treated to remove pollutants and achieve acceptable environmental release quality.

Typical, non-limiting examples of waste materials suitable for treatment with the present invention include solid wastes which are subject to crystal chemical substitution, as explained herein, and wastes which are destroyed or collected by the effluent treatment system of the present invention. The sources of such waste are many diverse industries and other sources, for example, petroleum industry, pesticide end-users, drycleaning and laundry, educational or vocational institutions, printing and allied industries, plating industry, coal burning industries such as utilities, transportation industry, construction industry, cleaning and cosmetics plants, wood preserving operations, mining industry, textile industry, hospitals and other health care institutions, chemical manufacturing industry, metal manufacturing industry, pulp and paper industry, various scientific laboratories, installations using boilers and industrial furnaces, and waste treatment, among others.

Wastes suitable for reaction resulting in crystal chemical substitution include, for example: Inorganic material, such as aluminum, cadmium, cadmium salts, chromium, copper salts, copper, certain dyes, iron, magnesium, magnesium hydroxide, magnesium oxide, manganese, certain metal salts, certain metal sulfates, certain metals including molybdenum, nickel, nickel salts, nickel trace, tin, titanium, titanium dioxide, vanadium and zinc, zinc cyanides, and zinc salts.

Wastes suitable for treatment by destruction and/or collection in the effluent treatment system include inorganic and organic wastes. Inorganic materials include, for example, coke, nitrogen compounds, nitrate, arsenic, arsenic acid, bismuth, certain dyes, lead, lead oxide, mercury, selenium, silver and strontium. Organic materials include, for example, 1-butanol, 1, 1, 1-trichloroethane, 1,4-dioxan, acetone, acetophenone, acrylamide, acrylic resins, alcohols, aromatic hydrocarbons, benzene, creosote, cresols, diethylene triamine, dinitrotoluene, diphenylamine, ethyl amine, ethyl benzene, isopropyl alcohol, maleic acid, methanol, monochlorobenzene, nitrobenzene, nitrobenzene nitrophenol, nitrophenol, nitrotoluene, oil, o-toluidine HCl, toluene, vegetable oil, xylene, animal organics, chlorinated hydrocarbons, chlorinated phenols, chlorinated solvents, e.g., chlorobenzene and chloroform, dichlorobenzenes, dichlorobenzidine, epoxy resins, hexachlorocyclopentadiene, methyl isobutyl ketone, methylene chloride, naphthalene, amines, nitrites, o-chlorophenol, phenol, phenolics, phenylenediamine, trichlorophenol and waxes.

Referring now to the drawings in detail, wherein like numerals indicate like elements, FIG. 1 is a schematic diagram of the system 10 of the present invention for implementing the process for converting solid waste material into an environmentally acceptable product using high temperature through an exothermic reaction of oxygen and iron-containing metals to create a molten metal oxide bath. FIG. 1 also schematically depicts the effluent treatment system according to the present invention for removing harmful constituents from the effluent to produce an environmentally acceptable effluent suitable for atmospheric release.

As used herein, the term "environmentally acceptable" means that the resulting product from the solid waste or effluent generated during the processing of the solid waste, complies with the laws of the United States of America and the regulations of the United States Environmental Protection Agency relating to environmental quality of the products so treated. It is believed that the environmentally acceptable products made by the apparatus in accordance with the process of the present invention will also comply with state and local laws and regulations relating to the environmental quality of such products.

Most of the system 10 used to treat commercial quantities of waste is sufficiently efficient to be conveniently housed in a structure having a maximum of about 2000 sq. ft. of floor space and a ceiling height of about 24 ft. The system 10 includes a multi-zone reactor or reaction chamber 12, connected by an effluent conduit 13 to a dual compartment chamber 14. The dual compartment chamber to be described in more detail hereinafter comprises a first heating chamber and a first precipitator which may comprise a magnetite spinel filter to be described hereinafter. Other components of the system include a particulate collector 16 associated with the precipitator. Water cooled heat exchanger piping 19, connects the dual compartment chamber to a dry type dynamic precipitator 20. Conduits 15 and 17 respectively connect the dual chamber 14 to a water recirculation chamber 18 and the water recirculation chamber to the water cooled heat exchanger piping 19.

Other equipment used in the system are a wet neutralizing particulate collector 24, a dehumidifier 28, another particulate collector 30, and filters 32. Associated conduits and piping interconnect the various components.

Exterior to the structure are located a baghouse 34, its associated stack 35 and effluent monitoring means 37 electrically connected by conductor 39 to a sensor in the stack.

Figure 2:
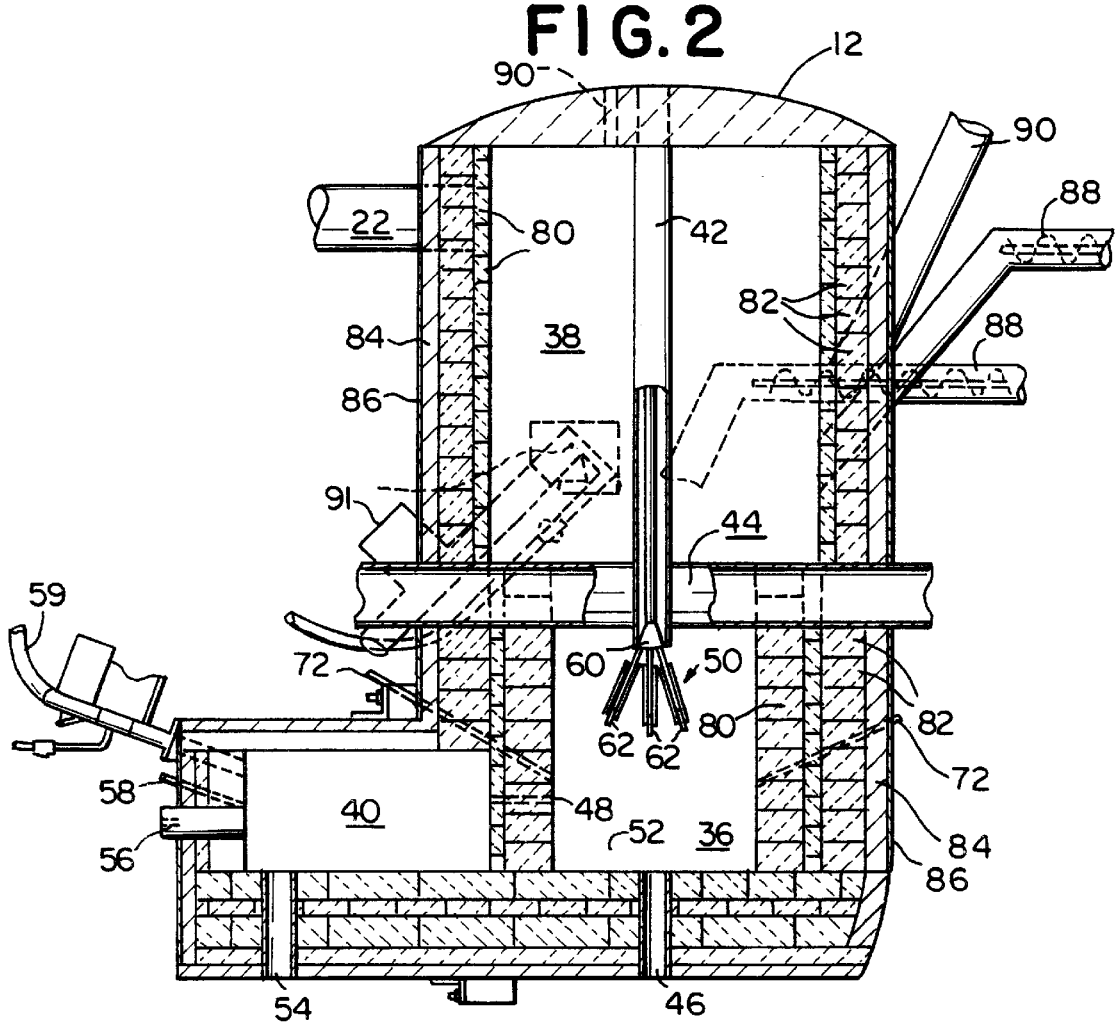
FIG. 2 is a vertical cross-sectional view of a three-zone reaction chamber of the present invention.

Now referring to FIG. 2, the reaction chamber 12 has three zones having an interior structure of an appropriate combination of hot face refractory 80, lining refractory 82, insulating castable 84 and stainless steel shell 86, materials which satisfy temperature and chemical compatibility requirements. The interior of the reactor must be capable of withstanding a temperature in excess of 1500° F., and, preferably temperatures within the range of about 2700° F. to about 3000° F. If desired, heat exchangers (not shown) may be installed on an outer surface of the stainless steel shell 86 of the reaction chamber 12 to provide sufficient cooling.

A first or primary melt zone 36 is located below and in communication with a second effluent zone 38. A third zone 40, which is a secondary melt zone, is in open communication with the first melt zone 36. Effluent generated in the third zone 40 communicates with the second zone 38 through conduit 41.

The structure of the reaction chamber 12 defined by the second zone 38 is supported by a support structure in a suitable manner including supporting members such as horizontal beam 43. The first zone 36 and the third zone 40 are removable and interchangeable as a modular unit or as separate modules to allow for the processing of different waste streams, as well as to provide for quick and easy repairs as needed. For example, alumina refractories would be used for treating wastes having acidic melts, while magnesia refractories would be used for treating wastes resulting in basic melts.

The lower sections of the reaction chamber 12 including first zone 36 and third zone 40 are removably attached, as for example, by beams 45 and 47, to the other support members for the reaction chamber. Fasteners 49 and 51 connect zones 36 and 40 together and connect the portion of the reaction chamber including such zones to the portion of the reactor having the second zone 38.

The second zone 38 is connected to insulated exhaust piping 13 and includes an oxygen delivery assembly 42. Also included in the second zone 38 are auger portals 88, camera portals 90, infrared temperature sensor portals (not shown), a safety door (not shown) and a heater 91, preferably an air/gas burner. However, one of ordinary skill in the art would recognize that other heater elements, such as electric heaters, electric arcs, plasma arcs, lasers and the like could be used in place of the air/gas burners 91 or other such heating means used in the present invention. One constructed embodiment of the second zone 38 is about 36 inches in diameter by about 48 inches in height.

The first zone 36 is in open communication with the second zone 38 through an opening 44. The first zone 36 includes a drain hole 46 having a pneumatic slide gate (not shown) and a portal hole 48 in communication with the third zone 40.

Referring again to FIG. 2, the first zone 36 further includes four compressed air lances 72, which act (1) to agitate the molten metal oxide bath; (2) to maintain proper temperatures (i.e., preventing overheating of the molten metal oxide bath by quenching); and (3) as feed or insertion tubes to introduce a powdered or liquid hazardous or other undesirable waste stream directly into or above the bath of molten metal oxide. In one constructed embodiment, the portal hole 48 extending between the first and third zones is about one inch in diameter and is located about 7.5 inches above a floor 52 of the first zone 36. In the same constructed embodiment, the first zone 36 is about 19.5 inches in diameter by about 30 inches in height.

The third zone 40 includes the portal hole 48, a drain hole 54 having a pneumatic slide gate (not shown), a burner exhaust port 56 which also functions as a continuous drain hole, two compressed air lances 58 and an air/gas burner 59. In the constructed embodiment, the third zone has a width of about 8 inches, a length of about 14 inches and a height of about 14 inches. The operational and functional interrelationships of each of the foregoing elements are explained below.

A coherent radiation source (not shown) may be positioned strategically within the structure to utilize its energy to penetrate possible solidified or plugged drain holes, preferably with the assistance of oxygen. Preferably, the coherent radiation source is a 250 watt/cw carbon dioxide laser. The coherent radiation is focused on the drain holes through a series of water cooled mirrors.

Figure 3:
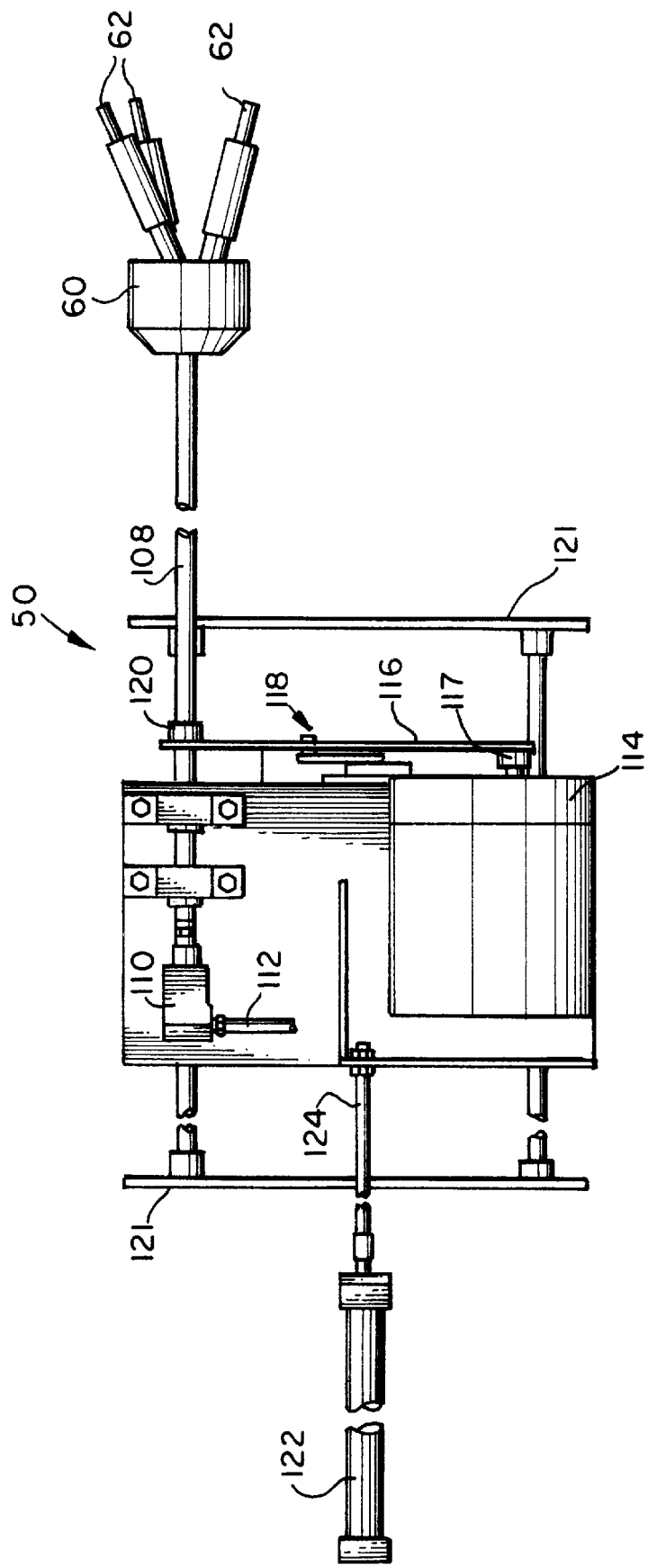
FIG. 3 is an elevational view of an oxygen lance assembly useful in the present invention.

The details of a rotating and retractable oxygen lance assembly 50 are shown in elevation in FIG. 3, although its position in use is best seen in FIG. 2. The oxygen lance assembly includes a lower manifold 60 having three branching lances 62 extending through the second zone 38 into the first zone 36 as best shown in FIG. 2. The lower manifold 60 is connected to an external pure oxygen supply through an extension pipe 108, a rotary union 110 and an oxygen inlet 112. The pure oxygen supply is located in an isolated area outside of the housing structure. The pure oxygen supply to the lance assembly 50 is regulated by a flow-meter and pressure gauge located in an operations control room (not shown).

The oxygen lance assembly 50 is rotated by a gear motor 114 which drives a roller chain 116 through a driving sprocket 117. The roller chain 116 is tensioned by a tensioner assembly 118. The roller chain 116 engages a driven sprocket 120 attached to the extension pipe 108 causing rotation of the extension pipe 108, manifold 60 and lances 62.

The oxygen lance assembly 50 is moveably mounted on a fixed frame 121. The assembly 50 is extended and retracted by a cylinder 122 which is attached to the assembly by an extension rod 124.

Although the preferred means for introducing oxygen into the reaction chamber and maintaining atmosphere within the reaction chambers as substantially pure oxygen is in the form of the rotatable lance assembly 50, other oxygen injector devices may be used. The only requirement is that the piping and connections to the reactor be compatible with and not adversely corrode the refractory lining.

Figure 4:
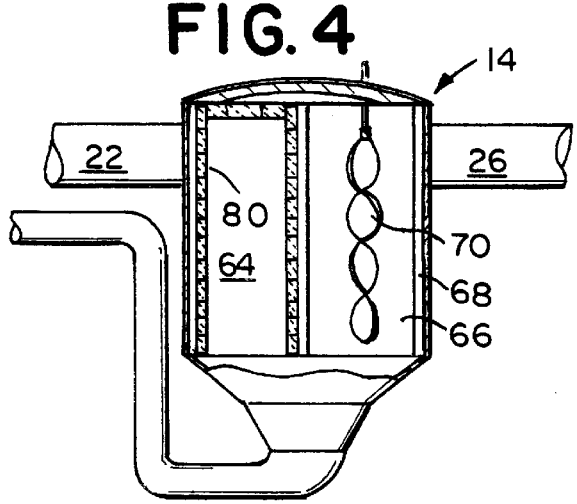
FIG. 4 is a vertical cross-sectional view of a dual effluent reburn/heat exchanger chamber useful in the present invention.

Referring now to FIG. 4, the system apparatus 10 also includes the dual compartment chamber 14 comprising a heating chamber and a heat exchanger which acts as a first precipitator. A first compartment 64, fed by exhaust piping 13, functions as an effluent heating or reburn chamber and includes an air/gas burner (not shown) and an interior having an appropriate combination of hot face refractory 80 and insulating castable 84. A second compartment 66 functions as a rapid cooling heat exchange chamber and precipitator. The second compartment 66 includes a water jacket 68 and air mixers 70. The second compartment 66 of the dual compartment chamber 14 is connected to heat exchanger piping 19.

A first particulate collector 16 for collecting a first portion of particulate matter precipitated in the second compartment 66 of the dual compartment chamber 14 is connected to the second compartment or is within the exhaust line 19 extending from the dual compartment chamber 14. A suitable particulate collector is a pulse jet particulate collector.

Another suitable particulate collector is a filter using as the filtering medium finely divided spinel including a significant component of magnetite, recycled from the environmentally safe solidified metal oxide produced by the present invention.

Further included in the system apparatus 10 are solid waste material handling means such as augers 88 which can be supplied by hoppers, conveyers, tipping bays, loading ramps and the like. It is well known to those skilled in the art that choices of material handling equipment may vary depending upon the waste streams to be handled and the size of the reactor to be built.

Figure 5:
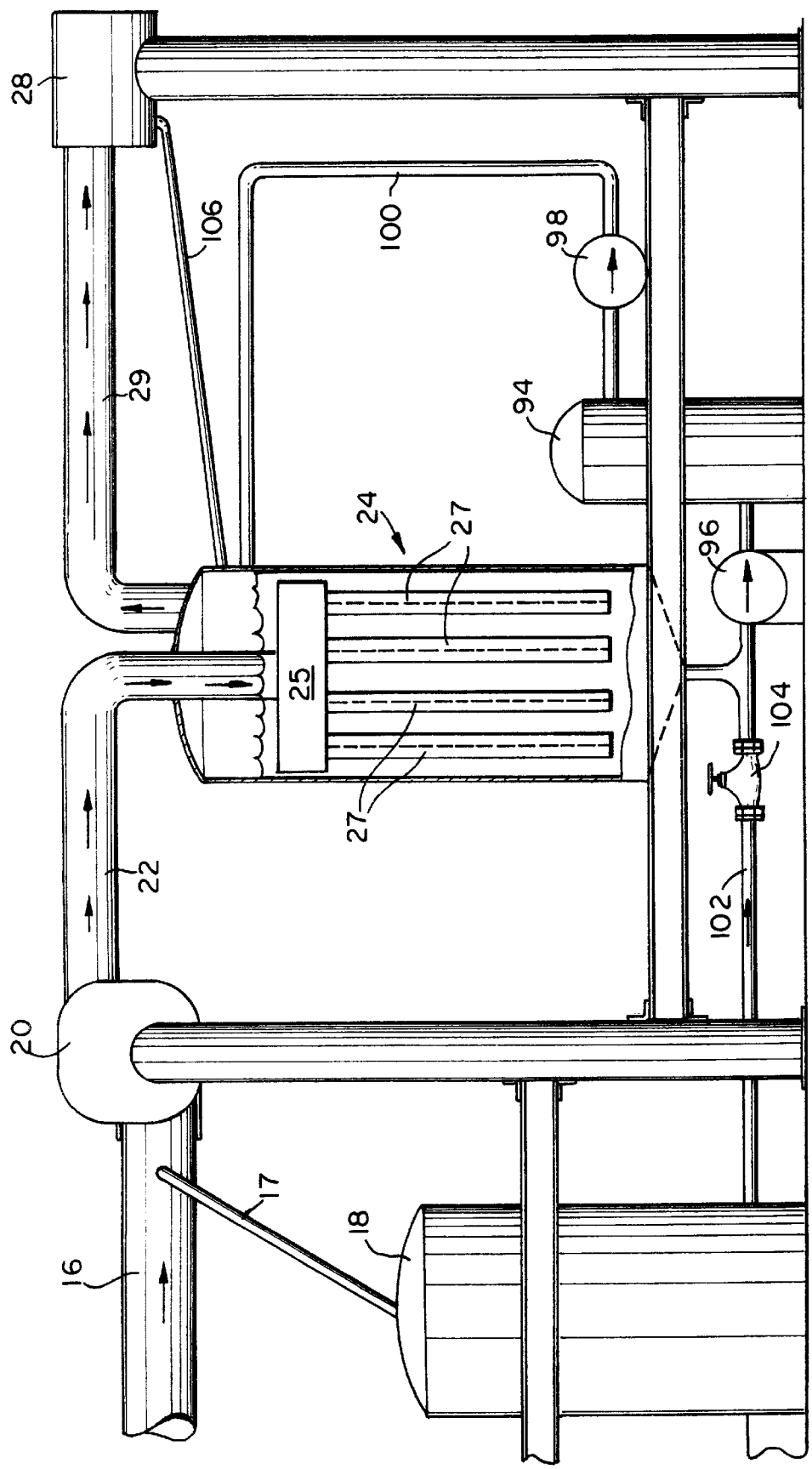
FIG. 5 is a partial elevational view of a portion of the system apparatus with a vertical cross-sectional view of the water neutralizing chamber.

Now referring to FIG. 5, another portion of the system apparatus 10 further includes a second precipitator 20, such as a dry type dynamic precipitator. A dynamic precipitator is a combined air mover and particulate collector with a large number of shaped blades attached to a concave impeller disk. The rotation of the impeller creates a force suitable for drawing in particulate laden effluent and causes the particulates to turn in an arc of nearly 180° before passing through a scroll to the outlet. The particulate matter is thrown by centrifugal force to the blade tips where they are trapped and conveyed by a secondary circuit to a hopper for removal.

The system 10, as also shown in FIG. 5, further includes a water filter 94 having a supply pump 96. A return line 100 connects the return pump 98 to the wet neutralizing particulate collector 24. Water supply line 102 supplies the collector 24 through a valve 104. The supply line 102 is fed from the water recirculation chamber 18 which also supplies the heat exchanger piping 19 through a supply line 17. Also included in the system apparatus 10 is a dehumidifier water return line 106 connecting the dehumidifier 28 to the wet neutralizing particulate collector 24. Collector 24 also includes outlet conduit 103 for drainage into line 102.

The wet neutralizing particulate collector 24 includes a manifold 25 which branches into four perforated nonreactive pipes 27. The details of the operation of the wet neutralizing particulate collector 24 will be discussed below. In general, this component functions in two respects. The first is to neutralize the pH of the water within the wet neutralizing particulate collector by appropriate additions of acid or base, as necessary, from sources schematically depicted as 21 through conduits 23. Appropriate pH monitoring equipment (not shown) is used to monitor the pH of the water within the wet neutralizing particulate collector. The second function of the wet neutralizing precipitate collector 24 is to collect a second portion of particulate matter from the effluent. This function will be described in more detail hereinafter.

Details with respect to the rest of the equipment forming the apparatus of the present invention will be made clear hereinafter with respect to the following explanation of the operation of the process of the present invention.

In use, the hazardous or other undesirable iron-containing metal waste materials or other hazardous or undesirable non-metallic wastes are introduced in conjunction with iron or iron-containing metal wastes into the reaction chamber 12 where they are heated in the first melt zone 36 to a sufficient temperature in the presence of pure oxygen to convert the waste material into a molten oxide and an effluent of gas and particulate matter. Upon exiting the third zone through the drain hole 54 or drain hole 56, the molten oxide solidifies into an environmentally acceptable, potentially recyclable inorganic mixed metal oxide material. The conversion process is continuous and exothermic after initiation in the presence of iron, a substantially pure oxygen environment and a source of initiating heat. The oxygen environment would be 100% pure, except for the volatile constituents resulting from the treatment of the waste in the molten oxide. For all practical purposes, as explained hereinafter, the atmosphere within the reaction chamber 12 is maintained as a fully saturated pure oxygen environment. The effluent is processed to remove hazardous or otherwise undesirable particulate matter and other constituents, also in an oxygen-rich atmosphere.

Where the hazardous waste material has little or no BTU value, as in the case of municipal incinerator ash, a combustible material such as coal, tires, etc., in conjunction with iron-containing metal waste, is used to obtain the high temperature necessary for the conversion of the waste material and initiate the exothermic reaction which results in the conversion process being self-sustaining under a continuous flow of oxygen. Alternatively, the process can be initiated and sustained by practiced heating methods using external heating for those waste streams that are not subject to self-sustaining exothermic reactions.

More specifically, on startup, the first zone 36 of the reaction chamber 12 is preheated by an air/gas burner to a level that satisfies the characteristics of the hot face refractory 80. Then the burner may be turned off. The third zone 40 is also preheated by an air/gas burner 59 and maintained at a temperature that will maintain the waste material in a molten state. A small amount of combustible material, such as coal, preferably oval-shaped rice coal, is introduced into the preheated first zone 36 along with an amount of iron or iron-containing waste metal material to start creating a molten metal oxide bath. A surprisingly small amount of combustible material, such as rice coal, is heated with the iron or iron-containing waste in the oxygen environment to initiate the exothermic reaction which sustains the waste conversion process. Amounts of coal on the order of about 0.5 lb. per 800 lbs. of iron-containing waste (about 0.06%) has been effective. Amounts from about 0.05 to about 3% of the initiating combustible material are preferred.

Additional hazardous or undesirable waste material is then introduced to the initial molten metal oxide bath using auger portals 88, for example. In one constructed embodiment, the first zone 36 is filled with an iron-containing metal waste material to a depth of about 9 inches and is heated to a temperature of about 2000° F. to about 3000° F. The metal waste material melts within minutes.

A feature of the present invention is the use of an iron-containing metal waste material to start and maintain the process. The initial bath of molten metal oxide is accelerated with oxygen and previously described waste, to a large viable bath of high temperature liquid which is capable of handling commercial volumes of waste. Although the initial volume of the molten bath is small, as the volume grows based on the conversion of additional waste, the bath engulfs the newly introduced waste material and permits its transformation in conjunction with a continuous flow of oxygen at commercially practicable rates. As the volume of the bath increases, the amount of waste that can be processed also increases. Tests of the process in an experimental chamber have resulted in waste material treatment rates of 16 lbs/minute without losing air quality for the exhausted effluent. Present scale-up calculations indicate that rates of 30 to 40 lbs/minute should be capable of being accomplished.

If carbonaceous material is present in the molten metal oxide bath, carbon boils can occur where the bath height rises at a disproportionate level relative to the height of material in the bath until carbonaceous material is exhausted from the bath. The additional height of the first zone 36 allows for such occurrences. Additionally, the oxygen lance 50 is retracted during a carbon boil.

Oxygen is also introduced to create and maintain the required oxygen environment. Oxygen is fed into the reaction chamber 12 preferably through the rotating, retractable oxygen lance 50. Other oxygen injection or introduction equipment and components could be used, so long as they are effective to introduce and maintain the appropriate high oxygen environment capable of supporting and sustaining the exothermic reactions. The oxygen flow rate is about 350 to about 700 ft$^3$/hour, preferably about 600 ft$^3$/hour. The rotating oxygen lance 50 causes the introduced oxygen to swirl in a vortex within the reaction chamber 12. The swirling movement of oxygen and introduction of compressed air through the lances 72 agitate the bath, enhance the heating process and prevent localized hot spots.

After the starting material is liquified and converted to a bath of molten metal oxide, waste material is continuously delivered into the reaction chamber 12 by the solid waste material handling means. The feed rate is about 16 lbs/minute in a constructed embodiment, which is the typical operating rate for the system described herein. The compressed air lances 72 of the first zone 36 provide further mixing by further agitation of the molten metal oxide bath. After startup, powdered or liquid waste materials may be introduced into the bath through the compressed air lances 72. The temperature of the molten metal oxide bath is maintained, preferably by the exothermic reaction, in excess of 2000° F., preferably at about 2700° F. to about 3000° F. The temperature within the first melt zone 36 directly above the molten metal oxide bath is about 2000° F. to about 2500° F.

When the molten metal oxide bath reaches a suitable depth, such as 7.5 inches in the constructed embodiment, the molten material drains through the portal hole 48 into the third zone 40, which comprises a second melt zone of the reaction chamber 12. In the third zone 40 of the reaction chamber 12, the compressed air lances 58 provide turbulence in the molten material to assure a homogenous melted mixture. When the molten material reaches a suitable depth in the third zone 40, such as about 6 inches in the constructed embodiment, the material flows out of the continuous drain hole or port 56, which is preferably associated with a chute, into a mold system or receiving container where it solidifies. Likewise, the molten material may be removed via drain hole 54.

Alternatively, the molten material can be separated into small globules by a compressed air stream. The small globules are then allowed to cool and harden into individual pebbles of metal oxide or mixed metal oxides of spinel structure, preferably including magnetite ($Fe_3O_4$). The molten oxide may be passed through a moving chain to create, upon cooling, a finely divided solid material comprised largely of magnetite. The finely divided solidified metal oxide resultant product (substantially magnetite and other oxide constituents) may be placed within a filter canister or other housing and used as a magnetite filter for separating particulate matter from the effluent.

When the molten metal oxide material is solidified, in view of the high temperature treatment of the iron-containing waste material in a high oxygen environment, the solidified material is believed to have a spinel structure. For example, a significant exothermic reaction is believed to be $2Fe+1.5\ O_2 \rightarrow Fe_2O_3$ (hematite).

This chemical reaction represents the complete oxidation of all iron in the steel or other iron-containing additive or waste material being treated. In reality; the reaction is not complete and the solidified melt forms a mixture of wustite and ferrite-spinel. This reaction is also exothermic in the presence of a substantially pure oxygen environment, and proceeds according to the following reaction:

$$4Fe + 2.5\ O_2 \rightarrow FeO\ \text{(wustite)} + Fe_3O_4\ \text{(ferrite-spinel)}.$$

A spinel structure is a particular structural arrangement of atoms within a molecule having the following general formula:

$$AD_2O_4.$$

Spinel structures may incorporate into its lattice elements that include but are not limited to the following: Ni, Mg, Co, Cu, Zn, Fe, Mn, Si, Ge, V, Ti, Tc, Mo, Pb, Pt, Sn, Al, Cr, Ga, Rh, In and Cd. Because of the structural arrangment of atoms in the spinel structure, different sized elements having certain indicated valences may be chemically bound within the spinel structure. Thus, A in the generalized spinel structural formula represents an element having a valence of two or four and D represents an element having a valence of two or three.

Preferably, element A comprises Co, Cu, Fe, Ge, Mg, Mn, Ni, Ti or Zn. Preferably, D represents an element comprising Al, Cr, Fe, Mg, Mn or V.

Preferably, at least one of A and D is Fe. By substituting for the iron in a magnetite spinel structure, in the crystal chemical substitution discussed above, the substituted element is so chemically bound within the spinel structure that the treated solid product according to the present invention is of environmentally acceptable quality, and can be used for purposes such as road building aggregates, landfill, and the like.

As a result of the heating of the waste material and its conversion to a molten material, an effluent of gases and particulate matter is formed. The effluent includes products of combustion and inorganics, yet contains virtually no products of incomplete combustion. The effluent travels through the second effluent zone 38 where the temperature is maintained in excess of 1500° F. The dwell time of the effluent in the second zone 38 is sufficient to destroy substantially all of the organic material that is capable of such destruction, and is in the order of about 2 seconds. The effluent in an oxygen-rich atmosphere flows out of the reaction 12 through the exhaust piping 13, to the dual compartment chamber 14. The temperature of the effluent in the exhaust piping 13 is about 1300° F. to about 1500° F.

The effluent enters the reburn compartment 64 of the dual compartment chamber 14 and is maintained at a temperature of approximately 1300° F. in the reburn compartment by an air/gas burner. Adequate dwell time of the effluent in the reburn compartment 64, on the order of about 4 seconds, is provided to destroy substantially all of the remaining organic materials that are capable of destruction under such conditions. The effluent, at a temperature of 1300° F., then passes into the heat exchanger and particulate collection area 66 which includes the water jacket 68 and air mixers 70. The effluent is rapidly cooled by approximately 400° F. to 6000° F. causing approximately 80% of the particulate matter to precipitate. The precipitated particulate matter may be removed from the effluent by a filter comprising finely divided recycled metal oxide product (substantially magnetite and other oxide constituents) created by the process of the present invention.

The oxygen-rich effluent is drawn from the chamber 14 at a flow rate of about 600 to about 1200 ft³/minute through a pulse jet particulate collector 16 and through a heat exchanger tube 19 by a dry type dynamic precipitator 20. The temperature drops by about an additional 300° F. The dry type dynamic precipitator 20 captures additional particulates from the effluent and creates a positive pressure in the effluent leaving the precipitator.

The effluent then flows through exhaust piping 22 into the manifold 25 of the wet neutralizing particulate collector 24. Perforated pipes 27 extend from the manifold 25 to below the surface of the water present in the wet neutralizing particulate collector 24. The perforations in the pipes 27 allow the effluent to escape into the water which also further cools the effluent. The water reacts with certain oxides remaining in the effluent. Thus, sulfur dioxide ($SO_2$) reacts in water to form sulfurous acid ($H_2SO_3$) which, in the presence of air or oxygen, converts to sulfuric acid ($H_2SO_4$) and sulfur trioxide ($SO_3$) reacts in water to form sulfuric acid ($H_2SO_4$) directly. Moreover, any ozone ($O_3$) is converted to oxygen. These acids are neutralized by addition of an appropriate base from source 21 flowing to the wet neutralizing particulate collector through conduit 23. In some instances, depending on the constituents of the effluent, the water may become basic, rather than acidic. In those instances, an acidic neutralizer would be added from source 21 to the wet neutralizing particulate collector.

The effluent bubbling through the pipes 27 is drawn through the wet neutralizing particulate collector exhaust pipe 26 to a dehumidifier 28 which removes essentially all of the moisture from the effluent. The removed moisture is returned to the wet neutralizing particulate collector 24 by a return line 106. After dehumidification, the effluent passes through conduit 29 to a pulse jet particulate collector 30. From there, the effluent passes through conduit 31 and through a series of carbon filters and high efficiency particulate arresting (HEPA) filters 32 having a combined flow rate capacity of 300–600 ft³/minute. The carbon filters deodorize and further neutralize the effluent. The HEPA filters remove from the effluent the bulk of the remaining particulate matter. The temperature of the effluent does not exceed 100° F. at this stage.

The effluent is conducted by a conduit 33 to a filtering baghouse 34, which is the last step in the process of purifying the effluent after the carbon filters and HEPA filters. The baghouse 34 includes concealed cloth filter bags which remove any possible remaining particulate having an average particle size greater than about one micron. The baghouse 34 has an automatic "shaker" system to keep the bags clean of particulate and collectibles. At the end of the baghouse 34 is a blower (not shown) which functions to draw the effluent from the wet neutralizing particulate collector 24 through the dehumidifier 28, pulse jet particulate collector 30, carbon and HEPA filters 32 and baghouse 34. The baghouse blower then exhausts the cleansed effluent to the atmosphere via stack 35 at a temperature of about 75° F. to about 100° F. An effluent monitoring means 37 is located near the stack 35, and is connected by an electrical conductor 39 to a sensor extending into the stack.

The present invention will now be described with respect to the following specific, non-limiting examples. The following examples are provided for illustrative purposes only and are not intended to limit the scope of the present invention. The ordinarily skilled artisan will recognize that the operating parameters of the process of the invention can be varied dependent upon the particular waste stream being treated.

EXAMPLE 1

A sample of solid waste material having the following composition was processed using the process and apparatus described above.

| | |
|---|---|
| rice coal | 1–2% (wt/wt) |
| steel pellets | 98–99% (wt/wt) |

The feed rate into the reaction chamber was 8.3 lbs/minute. The oxygen injection rate was 1200 ft$^3$/hour. The process was run for 20 hours. The following Table I sets forth various parameters measured in the stack.

TABLE I

| Time in Minutes | NO$_2$ ppm | SO$_2$ ppm | CO ppm | CO$_2$ ppm | O$_2$ % v/v | Temperature °F. |
|---|---|---|---|---|---|---|
| 10 | 0 | 0 | 10 | 1300 | 22.6 | 99 |
| 35 | 0 | 0 | 10 | 800 | 21.8 | 100 |
| 70 | 0 | 0 | 10 | 400 | 22.7 | 101 |
| 95 | 0 | 0 | 2 | 800 | 21.9 | 102 |
| 130 | 0 | 0 | 2 | 1300 | 21.6 | 102 |
| 155 | 0 | 0 | 2 | 1500 | 21.3 | 101 |
| 185 | 0 | 0 | 1 | 1400 | 21.1 | 100 |
| 215 | 0 | 0 | 1 | 1300 | 21.0 | 102 |
| 245 | 0 | 0 | 1 | 1700 | 20.9 | 103 |
| 270 | 0 | 0 | 1 | 1400 | 21.3 | 101 |
| 305 | 0 | 0 | 1 | 3100 | 21.0 | 105 |
| 335 | 0 | 0 | 1 | 2600 | 21.5 | 106 |
| 365 | 0 | 0 | 0 | 2000 | 21.4 | 105 |
| 395 | 0 | 0 | 0 | 1400 | 20.8 | 105 |
| 425 | 0 | 0 | 0 | 1100 | 21.0 | 106 |
| 455 | 0 | 0 | 0 | 300 | 20.7 | 109 |
| 485 | 0 | 0 | 0 | 1300 | 20.9 | 109 |
| 515 | 0 | 0 | 0 | 500 | 20.9 | 110 |
| 545 | 0 | 0 | 0 | 200 | 20.7 | 110 |
| 575 | 0 | 0 | 0 | 0 | 20.7 | 107 |
| 605 | 0 | 0 | 0 | 0 | 20.7 | 106 |
| 635 | 0 | 0 | 0 | 0 | 20.9 | 106 |
| 695 | 0 | 0 | 0 | 0 | 20.9 | 106 |

The average SO$_2$ measured throughout the run in the stack was 0 ppm, average NO$_2$ was 0 ppm, average CO was 2 ppm, average CO$_2$ was 1114 ppm, and the average oxygen was 22.5% v/v.

EXAMPLE 2

A sample of the solid metal oxide material produced by the process and apparatus discussed above using substantially the same waste material and operating parameters of Example 1 was subjected to elemental analysis. The results are set forth in Table II.

TABLE II

| Element | PPM |
|---|---|
| As | less than 0.05 |
| Cd | less than 0.05 |
| Cr | less than 0.05 |
| Pb | less than 0.05 |
| Se | less than 0.05 |
| Ag | less than 0.05 |
| Ba | less than 1 |
| Hg | less than 0.005 |

EXAMPLE 3

The metal oxide material produced using the above-described process and apparatus for processing steel waste material was subjected to X-ray diffraction and bulk chemical analysis. The X-ray diffraction analysis revealed the presence of three phases in the product, none of which were metals. The iron-containing waste material was oxidized to a mixture of spinels which include magnetite, Fe$_3$O$_4$, a second ferrite spinel related to franklinite, M$^{2+}$Fe$_3$O$_4$, and a third phase, wustite, FeO.

The results of the bulk chemical analysis are set forth in Table III.

TABLE III

| Oxide | wt % |
|---|---|
| Al$_2$O$_3$ | 0.84 |
| B$_2$O$_3$ | 0.04 |
| BaO | less than 0.01 |
| CaO | 0.17 |
| CoO | 0.05 |
| Cr$_2$O$_3$ | 0.23 |
| Fe$_2$O$_3$ | 90. |
| K$_2$O | 0.02 |
| MgO | 3.26 |
| MnO | 1.14 |
| MoO | 0.04 |
| Na$_2$O | 0.02 |
| NiO | 0.18 |
| P$_2$O$_5$ | 0.16 |
| SiO$_2$ | 1.79 |
| SrO | less than 0.01 |
| TiO$_2$ | 0.07 |
| V$_2$O$_5$ | 0.03 |
| ZnO | 0.09 |
| ZrO$_2$ | 1.48 |

Compositionally, the metal oxide product is composed of 90 wt % iron oxide (reported as Fe$_2$O$_3$ but not necessarily having a hematite structure) with minor amounts of MgO and MnO, along with Ni, Cu. Zn, Al and Cr. Spinel structural forms for these oxides were indicated.

It is postulated that when certain inorganic waste materials, such-an heavy metals, are introduced into the molten oxide environment, they are oxidized and substitute for Fe in the spinel structure. The spinel structure effectively traps the inorganic material preventing leaching from the ceramic material generated. Thus, it is important that the process of the present invention be conducted in the presence of adequate oxygen and heat to form iron oxides largely of magnetite (Fe$_3$O$_4$) and at least potentially, hematite (Fe$_2$O$_3$)

The present invention may be embodied in other specific forms without departing from the spirit or essential attributes thereof and, accordingly, reference should be made to the appended claims, rather than to the foregoing specification, as indicating the scope of the invention.

We claim:

1. A process of making a compound having a spinel structure comprising:

(a) introducing into a reactor solid phase reactants comprising an iron-containing metal and at least one constituent capable of forming a metal oxide having a spinel structure;

(b) introducing pure oxygen into the reactor in a manner to create and maintain in the reactor an oxidizing environment having oxygen present in an amount adequate for forming the compound having a spinel structure;

(c) generating sufficient heat within the reactor in the presence of the adequate amount of oxygen to heat and melt the reactants at a temperature of about 2700° F. to about 3000° F. to oxidize the reactants and form a molten oxide bath capable, upon cooling, of forming largely the compound having a spinel; and (d) cooling the oxidized molten reactants in the molten oxide bath to convert iron and at least a portion of the constituent capable of forming a metal oxide having a spinel structure into the compound having a spinel structure, the compound comprising iron and at least the portion of the constituent chemically bound in the spinel structure, the compound having a spinel structure being largely the product formed.

2. The process of claim 1 wherein the heat generating step (c) comprises generating heat by an exothermic reaction between the oxygen and the reactants.

3. The process of claim 2 wherein the heat generating step further includes initiating the exothermic reaction by heating the reactants in the presence of a combustible material to a temperature sufficient to initiate the exothermic reaction.

4. The process of claim 1 wherein the constituent comprises an element selected from the group consisting of Ni, Mg, Co, Cu, Zn, Fe, Mn, Si, V, Ti, Mo, Pb, Al, Cr, and Cd.

5. The process of claim 1 wherein in step (c), the constituent is present in a spinel structure having a formula $AD_2O_4$, wherein A is an element having a valence of 2 or 4 and D is an element having a valence of 2 or 3.

6. The process of claim 5 wherein at least one of A and D is Fe.

7. The process of claim 5 wherein A is selected from the group consisting of Co, Cu, Fe, Mg, Mn, Ni, Ti and Zn.

8. The process of claim 7 wherein at least one of A and D is Fe.

9. The process of claim 5 wherein D is selected from the group consisting of Al, Cr, Fe, Mg, Mn and V.

10. The process of claim 9 wherein at least one of A and D is Fe.

11. A method for synthesis of ferrite spinel comprising:

(a) introducing into a reactor a solid phase reactant consisting essentially of iron-containing metal;

(b) introducing pure oxygen into the reactor in a manner to create and maintain in the reactor an oxidizing environment having oxygen present in an amount adequate for forming the ferrite spinel;

(c) generating sufficient heat within the reactor in the presence of the adequate amount of oxygen to generate an exothermic reaction between the oxygen and iron-containing metal to oxidize the iron and produce a molten metal oxide at a temperature of about 2700° F. to about 3000° F., wherein the molten oxide is capable of cooling to form the ferrite spinel; and (d) cooling the molten metal oxide to form the ferrite spinel.

12. The method of claim 11 wherein the ferrite spinel is magnetite.

13. The method of claim 11 further comprising introducing at least one additional metal into the reactor and cooling the molten oxide to produce a ferrite spinel having the at least one additional metal in the ferrite spinel.

14. The method of claim 13 wherein the additional metal is selected from the group consisting of Ni, Mg, Co, Cu, Zn, Fe, Mn, Si, V, Ti, Mo, Al, Cr, and Cd.

15. The method of claim 11 wherein the exothermic reaction is self-sustaining.

16. The method of claim 13 wherein the ferrite spinel has the formula $AD_2O_4$, wherein A is an element having a valence of 2 or 4 and D is an element having a valence of 2 or 3 and wherein one of A and D is Fe.

17. The method of claim 16 wherein A is selected from the group consisting of Co, Cu, Fe, Mg, Mn, Ni, Ti, and Zn, and D is Fe.

* * * * *